United States Patent Office 3,506,688
Patented Apr. 14, 1970

3,506,688
HYDROXYALUMINUM SALT OF 2-BENZO-
FURANACETIC ACID
Samuel S. M. Wang, Indianapolis, Ind., assignor to The
Dow Chemical Company, Midland, Mich., a corporation of Delaware
No Drawing. Filed Jan. 5, 1968, Ser. No. 695,834
Int. Cl. C07d 5/44
U.S. Cl. 260—346.2                             1 Claim

ABSTRACT OF THE DISCLOSURE

The hydroxyaluminum salt of 2-dibenzofuranacetic acid is prepared by the reaction of 2-dibenzofuranacetic acid with aluminum chloride hexahydrate. The novel salt is useful as an anti-inflammatory agent.

SUMMARY OF THE INVENTION

This invention relates to salts of dibenzofuranacetic acid and is more particularly directed to the hydroxyaluminum salt of 2-dibenzofuranacetic acid corresponding to the formula:

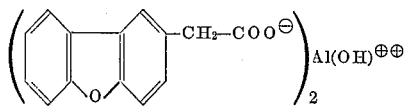

The novel salt is a crystalline solid which is slightly soluble in organic solvents, water and aqueous acid and which is soluble with decomposition in dilute aqueous sodium hydroxide solution. The compound is useful for administration to animals to alleviate symptoms of inflammation. The novel salt has been found to have anti-inflammatory activity as indicated by standard tests, such as the reduction of carrageenin-induced edema in small animals.

The compound of the invention is prepared by the reaction of 2-dibenzofuranacetic acid with aluminum chloride hexahydrate in aqueous base. The reaction proceeds when the reactants are contacted and mixed in an aqueous solution of base such as dilute aqueous sodium hydroxide. The reaction is carried out at temperatures of from about 80° to about 100° C. and is preferably carried out at a temperature of from about 90° to 95° C. The exact proportions of the reactants to be employed are not critical, some of the desired product being formed when the reactants are combined in any proportions; however, the reactants are preferably employed in equimolar proportions. The reaction is preferably carried out at a pH from about 7.8 to about 9 and in the presence of an alkali metal hydroxide such as sodium hydroxide or potassium hydroxide. The product precipitates in the reaction mixture and can be separated by conventional procedures such as filtration, decantation, centrifugation and the like. The product can be purified by conventional procedures such as washing with water and organic solvents.

In a convenient procedure, one molar proportion of 2-dibenzofuranacetic acid and one molar proportion of aluminum chloride hexahydrate are mixed together in an aqueous solution of sodium hydroxide having a pH of about 8. Additional aqueous sodium hydroxide solution is added, if necessary, to bring the pH of the reaction mixtre to a pH within the range from about 7.8 to about 9. The reaction mixture is then heated at a temperature within the reaction temperature range for a period from about 1 to 3 hours after which it is cooled and filtered. The product is collected as a filter cake and can be purified by conventional procedures such as washing with water and alcohols.

DESCRIPTION OF THE PREFERRED
EMBODIMENT

In a representative operation, 2-dibenzofuranacetic acid (90.4 grams; 0.2 mole) was dissolved in aqueous 0.2 molar sodium hydroxide solution and the pH of the solution was adjusted to pH 8.2. The solution was then heated to a temperature of 92° C. and added slowly to a heated solution of aluminum chloride hexahydrate (48.2 grams; 0.2 mole) in one liter of water. The reaction mixture was heated with stirring at a temperature of 95° C. for two hours after which it was cooled to a temperature of about 25° C. The cooled solution was filtered and the filter cake was washed with two separate portions of water and two separate portions of methanol. The hydroxyaluminum salt of 2-dibenzofuranacetic acid product was then washed with water until the washings contained substantially no detectable chloride ion, after which the product was dried. The product was found by analysis to have carbon and hydrogen contents of 68.0 and 4.0 percent, respectively, as compared with the contents of 68.0 and 3.9 percent, respectively, calculated for the named product. The product had a molecular weight of 494 and was found to decompose at a temperature of 330° C.

The compound of the invention can be administered to animals by conventional procedures for the alleviation of inflammation. The novel hydroxyaluminum salt of 2-dibenzofuranacetic acid can be employed as the active anti-inflammatory ingredient in compositions comprising the novel salt in admixture with known pharmaceutical carriers, including inert diluents, binders, lubricants, suspending agents, dispersing agents, preservatives, flavors and the like. It can be administered orally in the form of tablets, capsules, suspensions, emulsions or the like. The novel compound can also be formulated in sterile injectable compositions for administration by subcutaneous or intraperitoneal injection or the like.

In representative operations, the hydroxy-aluminum salt of 2-dibenzofuranacetic acid of the invention is found to reduce carrageenin-induced edema in rats administered the compound of the invention as compared with carrageenin-induced edema in untreated rats. In representative operations, reductions in carrageenin-induced edema from about 40 to about 70 percent are observed when the compound is administered orally at dosage rates from about 50 to about 200 milligrams per kilogram.

I claim:
1. The hydroxyaluminum salt of 2-dibenzofuranacetic acid.

References Cited

Gilman et al., Chem Abstracts, vol. 41, page 752 (1947).

ALEX MAZEL, Primary Examiner

B. I. DENTZ, Assistant Examiner

U.S. Cl. X.R.
424—285